United States Patent

Wendt et al.

[11] Patent Number: 5,948,852
[45] Date of Patent: Sep. 7, 1999

[54] PROCESS FOR PREPARING NON-AQUEOUS DISPERSIONS AND THEIR USE

[75] Inventors: Eckhard Wendt, Leverkusen; Robert Bloodworth; Markus Mechtel, both of Köln; Bernd Klinksiek, Bergisch Gladbach; Olaf Halle, Köln, all of Germany

[73] Assignee: GE Bayer Silicones GmbH & Co. KG, Erkrath, Germany

[21] Appl. No.: 08/908,216

[22] Filed: Aug. 7, 1997

[30] Foreign Application Priority Data

Aug. 12, 1996 [DE] Germany .................. 196 32 430

[51] Int. Cl.$^6$ .................................................. C08J 5/54
[52] U.S. Cl. ...................... 524/731; 524/783; 252/73; 252/573; 252/575; 252/77; 252/79
[58] Field of Search ............... 252/73, 573, 575, 252/77, 79; 524/731, 783

[56] References Cited

U.S. PATENT DOCUMENTS

| | | | |
|---|---|---|---|
| 5,116,536 | 5/1992 | Bücheler et al. | 252/314 |
| 5,462,687 | 10/1995 | Podszun et al. | 252/79 |
| 5,496,483 | 3/1996 | Herrmann et al. | 252/73 |
| 5,531,812 | 7/1996 | Monitigny et al. | 106/2 |
| 5,723,518 | 3/1998 | Kahl et al. | 523/324 |

FOREIGN PATENT DOCUMENTS

| | | |
|---|---|---|
| 0101007 | 2/1984 | European Pat. Off. . |
| 0685544A1 | 12/1995 | European Pat. Off. . |
| 4119670A1 | 12/1992 | Germany . |

*Primary Examiner*—Robert Dawson
*Assistant Examiner*—Caixia Lu-Rutt
*Attorney, Agent, or Firm*—Sprung Kramer Schaefer & Briscoe

[57] ABSTRACT

Process for preparing non-aqueous dispersions, wherein a liquid prepolymer is emulsified in a non-aqueous liquid, the droplet size of the emulsion is adjusted to 0.1 to 30 μm and the droplet size distribution $U_{90}$ is adjusted to less than 2 by means of a jet disperser, and the droplets are cured by a chemical reaction.

14 Claims, 4 Drawing Sheets

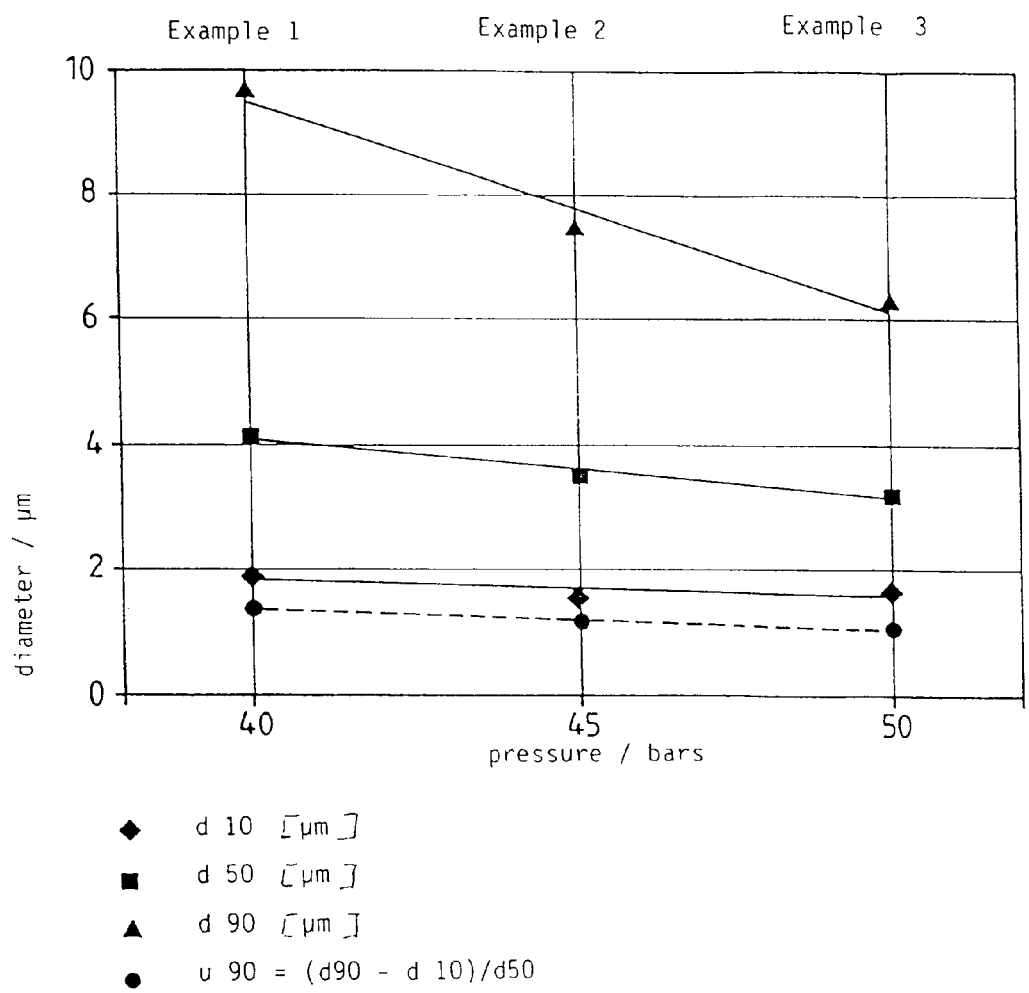

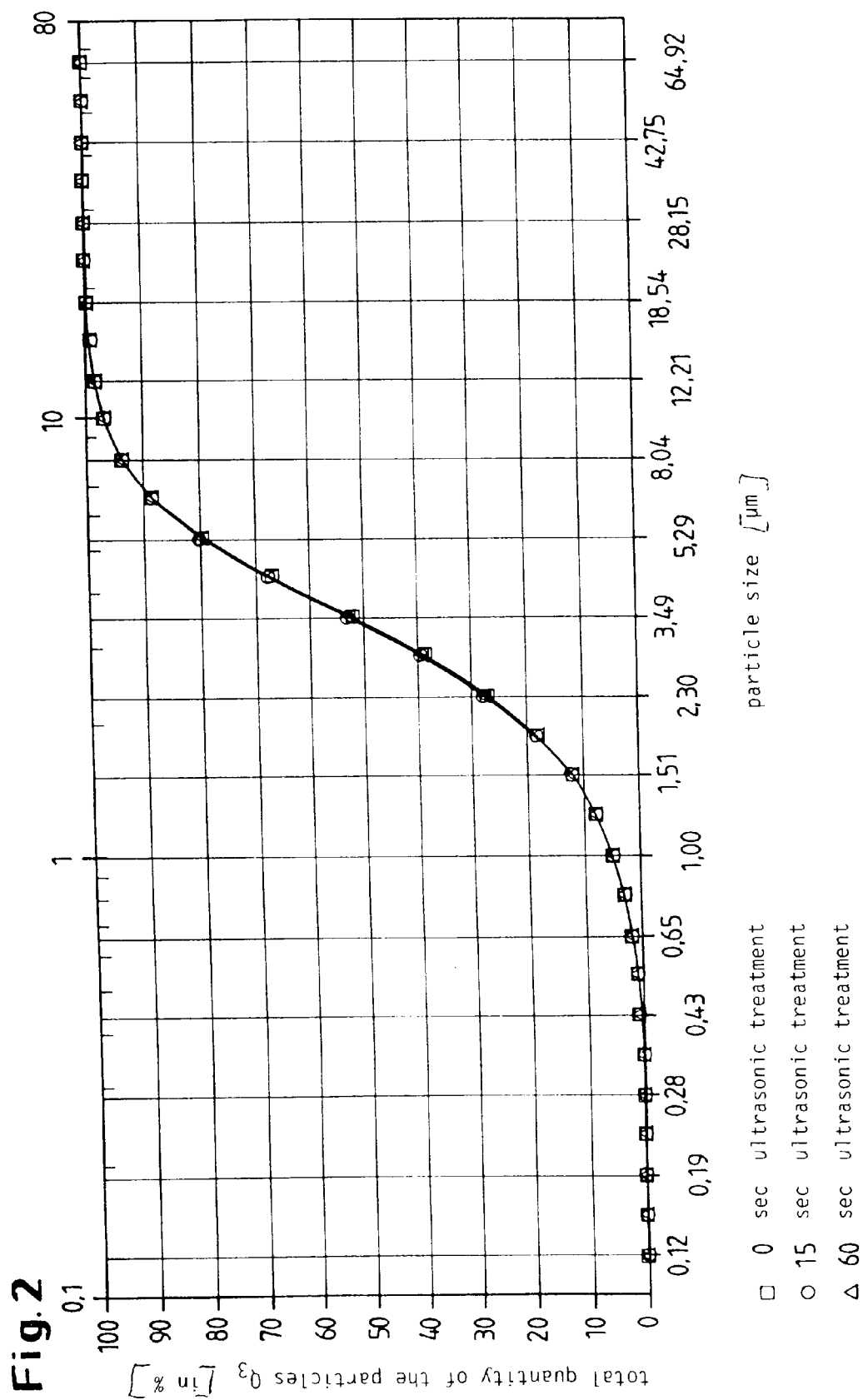

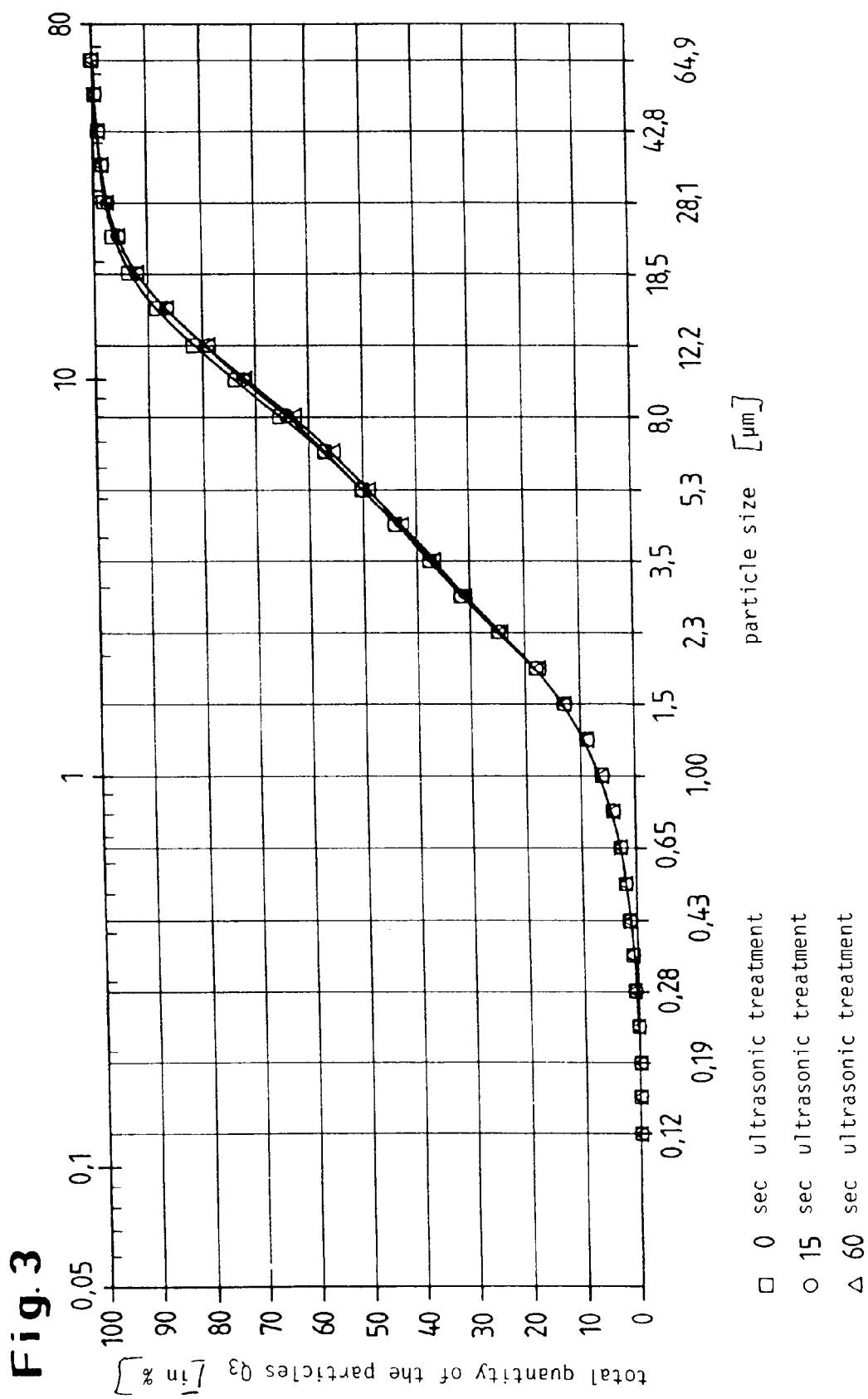

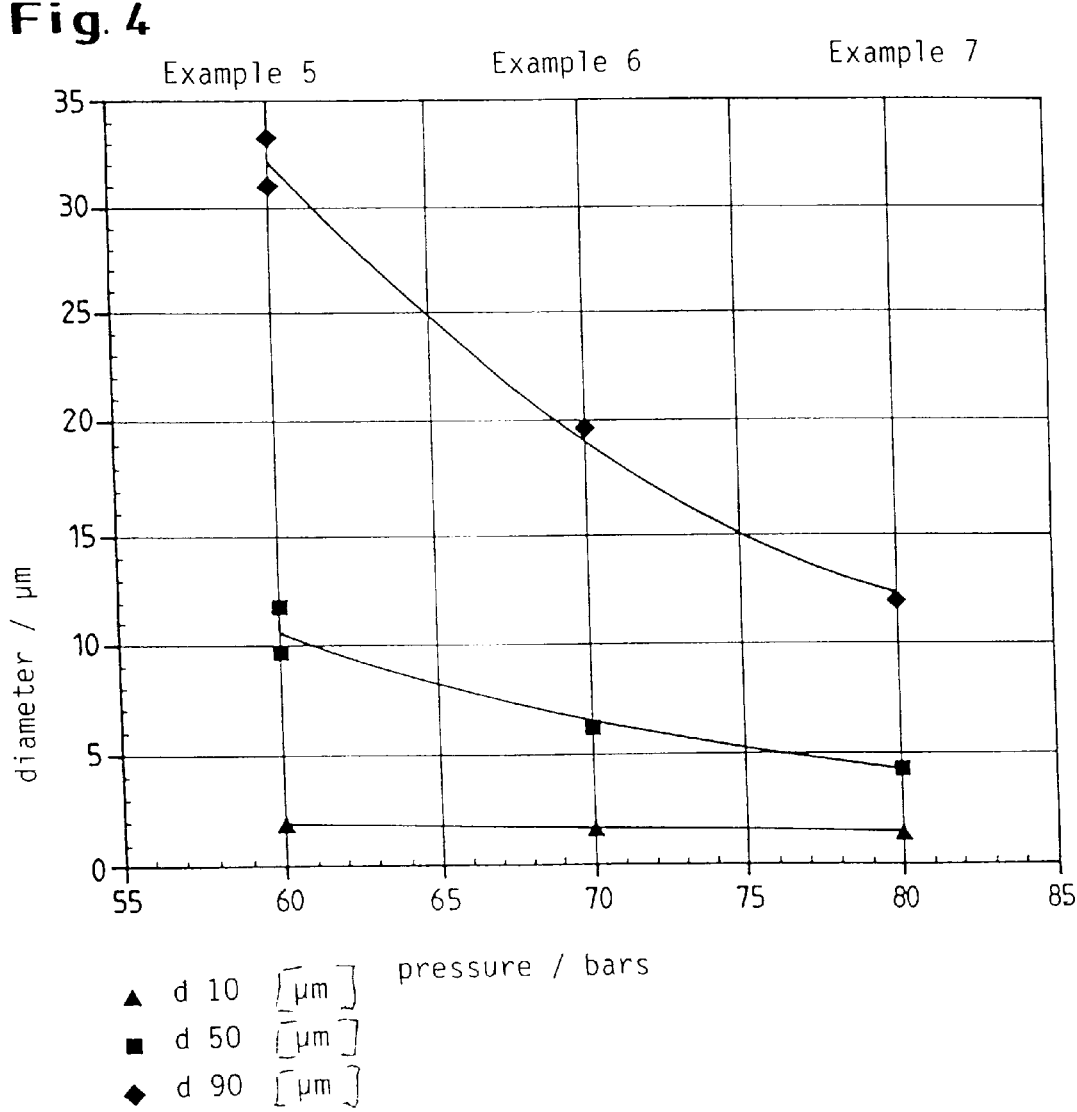

PROCESS FOR PREPARING NON-AQUEOUS DISPERSIONS AND THEIR USE

The present invention relates to a process for preparing non-aqueous dispersions and their use.

BACKGROUND OF THE INVENTION

Non-aqueous dispersions are becoming more and more important. They are used in particular as electro-rheologic fluids (ERF). Electro-rheologic fluids are understood to be dispersions of finely divided particles in hydrophobic and electrically non-conducting oils. The apparent viscosity of these dispersions changes very rapidly and reversibly from the liquid to the plastic or solid state under the effects of an electric field. The apparent viscosity is altered by both constant electric fields and alternating electric fields, wherein the flow of current through the ERF should be very small.

The increase in viscosity in an ERF on application of an electrical field can be explained qualitatively as follows: the colloidal, chemically stable, dispersed particles polarise in the electric field and agglomerate due to dipole interaction in the direction of the field lines. This leads to an increase in the apparent viscosity. The agglomeration procedure is reversible, i.e. if the electric field is switched off, the particles redisperse and the viscosity returns to the original value.

The electrical polarisability of the disperse phase is, therefore, an important prerequisite to the production of the electro-rheological effect. Therefore ionic or electronically conductive materials are often used as the disperse phase.

In some of the ERFs from the prior art, the disperse phase comprises organic solids such as, for example, ion-exchange resins (U.S. Pat. No. 3,047,507) or silicone resins (U.S. Pat. No. 5,164,105). In some cases, however, coated inorganic materials such as zeolites (U.S. Pat. No. 4,744,914) or silica gel (U.S. Pat. No. 4,668,417) are used. In the case of the substances mentioned, the electro-rheological effect is attributed to the solids being loaded with water. Small amounts of water increase the ionic conductivity and thus the polarizability of the disperse particles which is essential for producing the effect. Water-containing systems, however, are not very stable. Solids such as metal powders or zeolites have the disadvantage that they are abrasive. The abrasive effect can be greatly influenced by the choice of disperse phase. Therefore polymeric substances, in particular elastomers, are preferred to inorganic powders as disperse phases.

ERFs can be used wherever forces need to be transferred with the assistance of a low electrical power such as, for instance, in couplings, hydraulic valves, shock absorbers, vibrators or devices for positioning and fixing workpieces.

In addition to the general requirements for ERFs such as a good electro-rheological effect, high thermal stability, low power consumption and resistance to chemicals, the abrasiveness, basic viscosity and sedimentation stability of the disperse phase play an important part in the practical application of ERFs. The disperse phase should form as little sediment as possible, and in any case should be readily redispersible and also should not cause any abrasion under extreme mechanical stress.

An effective electro-rheological fluid should, therefore, have a low basic viscosity and a high viscosity after application of the electric field, i.e a large change in viscosity. As is well-known, the ER effect increases with the proportion by volume of disperse phase. Achieving a low basic viscosity with a high proportion of solids depends firstly on the shape and on the particle size distribution of the disperse phase and secondly on the dispersing effect of any dispersing aids used. In addition, the conductivity of the disperse phase depends on the particle size. Optimising these parameters is only possible by precise adjustment of the particle sizes or of the particle size distribution in the disperse phase. Traditional processes for preparing non-aqueous dispersions are based on milling solid substances to the desired particle size, followed by dispersion in the dispersion medium. U.S. Pat. No. 5,268,118 disclosed the spray-drying of polymer solutions or reactive monomer mixtures followed by dispersion of the solidified particles. In both processes, regulation of the particle sizes and their distribution is only possible by means of a costly classification and separation procedure for the particles produced. U.S. Pat. No. 4,996,004 describes non-aqueous dispersions of polyether polymers which were prepared by milling and subsequent dispersion in non-aqueous liquids. In U.S. Pat. No. 5,073,282, hydrophobic polymer dispersions were prepared by precipitation polymerization in a non-polar carrier liquid and loaded with a second, polar liquid in order to produce electro-rheologic fluids. Here, the particle sizes and their distribution are determined by the polarity of the monomers and solvents and can be varied only within narrow limits. There is, therefore, a need for a process for preparing non-aqueous dispersions which contain a high proportion of solids, which are sedimentation stable and which have a low basic viscosity and a large change in viscosity following the application of an electric field.

The object of the present invention was, therefore, to provide a simple process which enables the preparation of non-aqueous dispersions with this range of properties.

SUMMARY OF THE INVENTION

Surprisingly, it has now been found that non-aqueous dispersions with this range of properties can be prepared by emulsifying at least one liquid prepolymer, optionally in the presence of one or more conductive components, in at least one non-aqueous liquid, optionally in the presence of one or more dispersants, adjusting the droplet sizes of the prepolymer to 0.1 to 30 μm inclusive and the droplet distribution $$U_{90} = \frac{d_{90} - d_{10}}{d_{50}}$$

to less than 2 by means of a jet disperser and curing the emulsified particles in a chemical reaction.

The process according to the invention has two parameters available. The production parameters homogenizing pressure and number of homogenising nozzles or number of homogenizing steps to adjust the droplet sizes and the droplet distribution.

The present invention therefore provides a process for preparing non-aqueous dispersions, wherein at least one liquid prepolymer, optionally in the presence of one or more conductive components, is emulsified in at least one non-aqueous liquid, optionally in the presence of one or more dispersants, the droplet size is adjusted to 0.1 to 30 μm inclusive and the particle size distribution $U_{90}=(d_{90}-d_{10})/d_{50}$ is adjusted to less than 2 by means of a jet disperser and the emulsified particles are cured in a chemical reaction.

DETAILED DESCRIPTION OF THE INVENTION

The liquid prepolymers which can be used are any substances which can be converted into the solid state by condensation, addition and polymerization reactions or mixtures of liquid prepolymers with solid prepolymers, wherein these mixtures are also liquid. Conversion into the solid state is called hardening in the following.

Liquid prepolymers which can be used are substances such as, for example, polyethers, which have a maximum viscosity of 30,000 mPa.s. Solid polymers which can be used are polymers with a minimum viscosity of more than 30,000 mPa.s.

Liquid prepolymers and solid polymers can be made up, for example, from the same monomer units and in this case are differentiated by their viscosity.

Prepolymers which can be used in the context of the invention are linear or branched polyethers or polyesters or copolymers of these. Examples of linear polyetheroligomers are polyethylene glycols, polypropylene glycols, polytetrahydrofuran, statistically distributed ethylene glycol/propylene glycol copolymers or ethylene glycol/propylene glycol block copolymers, such as are sold, for example, under the tradename Pluronik by the GAF company. Branched polyether oligomers are, for example, Tris (polypropylene oxide)ω-ol-glycide ethers or other substances which are obtained by ethoxylation or propoxylation of higher functional hydroxy compounds such as, for example, pentaerythritol or 1,1,1-trimethylolpropane. The molecular weight of the glycols is between 62 and 1,000,000, preferably, however, between 100 and 10,000. The polyether oligomers preferably contain hydroxy groups. However, they may also contain amino, allyl or vinyl groups or carboxyl groups as functional terminal groups. Polyethylene oxide and polypropylene oxide mono or diamines are sold by Texaco under the tradename Jeffamin. Examples of products which contain vinyl groups are esters of the glycols with appropriate acids such as, for example, acrylic acid. Other preferred polymers are, for example, the polyesters which are sold, inter alia, by Bayer AG under the tradename Desmophen (e.g. Desmophen 170 HN, a reaction product of adipinacid, neopentylglycol and hexane-1.6-diol). Monomers with hydroxy (e.g. trimethylolpropane, hexane-1.6-diol), amino (e.g. hexane-1.6-diamine), (meth)acrylate (e.g. acrylacidmethylester), (metha)crylamide (e.g. acrylamide) or vinyl (e.g. styrene) groups may also be used.

The liquid prepolymer which is preferably used is at least one compound which contains hydroxy, amino, (meth) acrylate, methacrylamide and/or vinyl groups. The use of a prepolymer with aliphatic polyether chains is particularly preferred (e.g. trifunctional ethylene glycol, prepared by ethoxylation of trimethylolpropane).

Non-aqueous liquids which may be used are, for example, liquid hydrocarbons such as, for example, paraffins (e.g. n-nonane), olefins (e.g. 1-nonene, (cis, trans)4-nonene) and aromatic hydrocarbons (e.g. xylene), silicone oils such as polydimethylsiloxanes and liquid methylphenylsiloxanes with viscosities of 3 to 300 mPa.s. In a preferred embodiment of the invention, a silicone oil is used as the non-aqueous liquid. The non-aqueous liquid may be used on its own or combined with other non-aqueous liquids. The solidifying point of the liquid is preferably adjusted to be lower than −30° C., the boiling point is preferably higher than 150° C.

The viscosity of the non-aqueous liquid is preferably between 3 and 300 mPa.s at room temperature. Non-aqueous liquids with viscosities of 3 to 20 mPa.s are generally preferred because a lower basic viscosity is then obtained. In order to avoid sedimentation, the non-aqueous liquid should preferably have a density which corresponds approximately to that of the emulsified particles. Thus, for instance, by using halogen-containing polysiloxanes, which may be used as single substances or as mixtures with other silicone oils, non-aqueous dispersions can be prepared which, despite having a low basic viscosity, exhibit no sedimentation after several weeks.

Fluorine-containing siloxanes of the general structure given below are particularly suitable as non-aqueous liquids for preparing sedimentation-stable, non-aqueous dispersions.

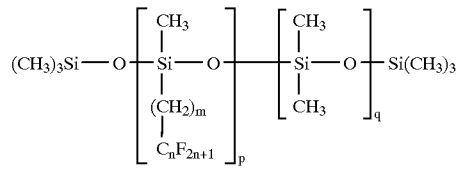

where
n=1–10
m=2–18
p=1–5 and q=0–10.

The viscosity of non-aqueous dispersions prepared by the process according to the invention is advantageously between 1 and 1000 mPa.s, preferably less than 500 mPa.s, in particular less than 250 mPa.s at room temperature, depending on the composition and the basic viscosity.

The average particle diameter of the dispersed non-aqueous prepolymer dispersed in the non-aqueous liquid according to the invention used is adjusted to be between 0.1 and 30 μm, preferably 0.5 and 25 μm, in particular 1 and 20 μm.

The particle size distribution $U_{90}$ is preferably adjusted to a value of 1.7 or less. The value of the particle size distribution $U_{90}$ is calculated using the following formula:

$$U_{90} = \frac{d_{90} - d_{10}}{d_{50}},$$

wherein $d_{90}$, $d_{50}$ and $d_{10}$ are defined as follows:
$d_{90}$ [μm]: 90% of the total number of all the particles have a particle size equal to or smaller than this value.
$d_{50}$ [μm]: 50% of the total number of all the particles have a particle size equal to or smaller than this value.
$d_{10}$ [μm]: 10% of the total number of all the particles have a particle size equal to or smaller than this value.

The jet disperser used in the process according to the invention is either a single-stage jet disperser in accordance with U.S. Pat. No. 4,996,004 and U.S. Pat. No. 5,116,536 or a multi-stage jet disperser. In a multi-stage jet disperser, the number of nozzles is preferably at least 2 to 50. A multi-stage disperser is therefore preferred. When using a single-stage jet disperser, a 1 to 25-fold throughput is preferred. The nozzles therefore have a diameter of preferably 0.3 to 1 mm, in particular of 0.5 to 0.8 mm. The ratio of length to diameter is preferably 1 to 4, in particular 1.5 to 2. Using these sizes, the volume of the dispersion zone is only 0.1 mm³ to 1 mm³. The nozzles are arranged either so that the emerging emulsion jet impinges on a solid wall or so that the emulsion jets actually impinge on each other. In the last mentioned variant, the flow energy still present after emerging from the nozzles is consumed by the jets colliding with each other.

Conductive components which are preferably used are those substances which are soluble or dispersible, in the molecular or ionic form, in the liquid prepolymer. In a preferred variant of the invention, an organic or inorganic semiconductor and/or an ionic conductor are used as conductive components. Examples of these types of conductive components are, for example, free acids or their salts with alkali or alkali earth metals or organic cations. The conductive components therefore include salts such as KCl, LiNO$_3$, CH$_3$COONa, LiClO$_4$, Mg(ClO$_4$)$_2$, KSCN, ZnCl$_2$, LiCl, LiBr, LiI, LiBF$_4$, LiPF$_6$, NaB(C$_6$H$_5$)$_4$, LiCF$_3$SO$_3$, N(C$_2$H$_4$)$_4$Cl etc. Furthermore, organic or inorganic semiconductors which have an affinity for the prepolymer may be used as conductive components. Examples of these are hydrocarbon particles, polyaniline, polyaniline derivates, polythiophene and its derivates and polyacenequinones.

The dispersants used may be surfactants which are soluble in the non-aqueous liquids and which are derived from, for example, amides, imidazolines, oxazolines, alcohols, glycol or sorbitol. Polymers which are soluble in the dispersion medium may also be used. Suitable polymers are, for example, those which contain 0.1 to 0 wt.-% of N and/or OH as well as 25 to 83 wt.-% of C$_4$–C$_{24}$-alkyl groups and have a weight average molecular weight in the range 5,000 to 1,000,000. The N and OH-containing compounds in these polymers may be, for example, amino, amido, imido, nitrilo, 5- and/or 6-membered N-containing heterocyclic rings or alcohols and contain the C$_4$–C$_{24}$-alkyl esters of acrylic or methacrylic acid. Examples of the N and OH-containing compounds mentioned are N,N-dimethylaminoethyl methacrylate, tert.-butyl acrylamide, maleic imide, acrylonitril, N-vinylpyrrolidone, vinylpyridine and 2-hydroxyethyl methacrylate. The previously mentioned polymeric dispersants generally have the advantage, as compared with low molecular weight surfactants, that the dispersions prepared using them are more stable with regard to sedimentation behaviour. Polysiloxsane/polyether copolymers of the following composition, given by way of example, can also be used:

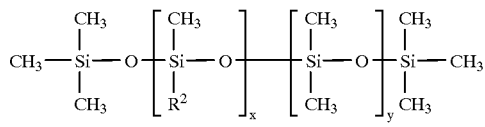

where each R$^2$ present in the copolymer, independently of each other, R$^2$ present in the copolymer may represent
—CH$_3$ or
—(CH$_2$)$_o$—O—(C$_2$H$_4$O)$_r$—(C$_3$H$_6$O)$_s$—O—R$^4$
where
o=0–3
r=0–50
s=0–50,
x=1–5,
y=1–50,
wherein the distribution of ethylene oxide and propylene oxide units is in blocks or is random, preferably random, and also may occur in the reverse sequence from the one shown, and R$^4$=H or an alkyl group.

The preferred combination is o=3, r:s=0.80 to 1.23, R$^4$=H, where
x=1–5 and
y=1–50.

Corresponding products are available from GOLDSCHMIDT AG under the tradename "Tegopren".

In addition to polyether/polysiloxanes, organofunctional siloxanes of the formula

may also be used as dispersants,
these being used as one uniform substance or as a mixture of at least two different types of organopolysiloxanes, where
R$^1$=a C$_1$–C$_{18}$-alkyl and/or phenyl group, preferably methyl,
R$^2$=identical or different SiC bonded organofunctional groups such as, for example,

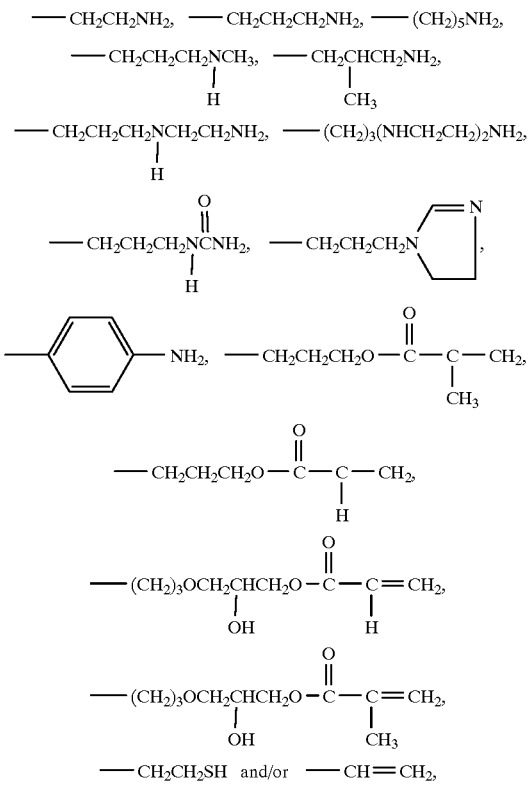

where
R$^3$=a C$_1$–C$_{18}$-alkyl or phenyl group and/or H,
a+b+z≦4 and
a, b are, independently of each other, 0 to 2.33 and
z=0 to 2.

The organofunctional siloxanes preferably have an average molecular weight of ≧1,400, wherein
a and b, independently of each other, are 0 to 2.04 and z=0 to 1.04.

In a particularly preferred embodiment, the weight average molecular weight is ≧3,800,
a=1.95–2.00
b=0.002–0.048 and
z=0.008–0.039, wherein
from a statistical point of view, only one functional SiC-bonded group is present per molecule.

From among all the groups listed, 3-aminopropyl and N-amino-ethyl-3-aminopropyl groups are particularly preferred.

Dispersants of the polysiloxane/polyether type or organofunctional polysiloxanes can be used separately or as a mixture of at least two different types of siloxanes.

Dispersants in accordance with U.S. Pat. No. 4,757,106 or U.S. Pat. No. 5,300,237 may also be used.

Reactive dispersants are preferred as dispersants. Reactive dispersants have functional groups which enable chemical linkage with the particle surface of the prepolymer. The type of functional group is governed by the chemistry of the hardening reaction. These are preferably the reaction products of OH-functional polydimethylsiloxanes with aminopropyltriethoxysilane and/or the reaction product of octamethyl-cyclotetrasiloxane with N-(β-aminoethyl-γ-aminopropyl)-methyldiethoxysilane.

To cure the emulsified particles, preferably at least one hardener is used, but this has to be adjusted to the functionality of the prepolymer. Hardeners in the context of the invention are reactive components, initiators and/or catalysts. Examples of hardeners for prepolymers with hydroxy and/or amino groups are, for example, di or multi-functional isocyanates. Isocyanates of various structures are sold by Bayer AG under the tradename Desmodur (e.g. toluylene-diisocyanate Desmodure® T 100. When using hydroxy and/or amino-functionalised prepolymers, toluylene diisocyanate is preferred as a hardener. To harden hydroxy and/or aminofunctionalised prepolymers, however, the acetate, amine, benzamide, oxime and alkoxy cross-linking agents commonly used in silicone chemistry may also be used. Radical hardeners are suitable for hardening prepolymers modified by allyl, vinyl, acryl or methacryl groups. Examples of these are organic azo compounds, such as azo-bisisobutyronitrile or peroxides such as benzoyl peroxide.

Additional prepolymers and hardeners may be added before, during or after adjustment of the particle size and particle size distribution of the emulsified particles in the emulsion. The adjusting chemical reaction leads to an increase in molecular weight in the emulsion droplets and/or also to a reduction in the number of functional groups, due to reaction of the functional groups in the liquid prepolymer. Up to 10% of the total amount of hardener being used is preferably added before dispersion with the jet disperser.

Viscous or solid particles whose spherical geometry is retained during and after reaction are formed from the liquid prepolymer due to the chemical reaction.

In the non-aqueous dispersion produced by the process according to the invention, the proportion of solids, i.e. the total amount of liquid prepolymer, dispersant and hardener and optionally present conductive components, is preferably up to 75%, in particular 30 to 70%, more precisely 40 to 60% by weight of total dispersion. In this case, the amount of conductive component, if present, is 0.05 to 5 wt.-% and the amount of dispersant is 0 to 10% by weight of total dispersion. The amount of hardener depends on the number of functional groups in the liquid prepolymer. When hardening by means of polyaddition or polycondensation, the ratio of functional groups in the liquid prepolymer to functional groups in the hardener is preferably equimolar.

The cured, emulsified particles produced by the process according to the invention preferably have a conductivity of $10^{-9}$ to $10^{-6}$ S/cm.

In the preferred embodiment of the process according to the invention, the following constituents are used:

as liquid prepolymer: polypropylene oxide/polyethylene oxide copolymers, trifunctional polyethylene glycols and/or polytetrahydrofuran as a non-aqueous liquid: polydimethylsiloxane as dispersant: the reaction products of OH-terminated polydimethylsiloxanes with aminopropyltriethoxysilane and/or the reaction product of octamethylcyclotetrasiloxane with N-(β-Aminoethyl)-γ-aminopropylmethyldiethoxysilane, as hardener: toluene diisocyanate, and LiCl, $ZnCl_2$ and/or carbon black as conductive component.

The process according to the invention, with the previously described parameters and ratios of amounts, may be performed either continuously or batchwise. Continuous process management is preferred.

According to the process according to the invention, the non-aqueous liquid is preferably emulsified into the liquid prepolymer, optionally together with the conductive component, wherein a phase inversion takes place by the further addition of non-aqueous liquid and passage through the jet disperser. In this case the non-aqueous liquid used may contain hardener and/or optional dispersant. In this type of procedure, an emulsion is first produced which changes into a double emulsion with a specific amount of non-aqueous liquid. Here, the greatest part of the phase boundary is pre-formed i.e. the forming of the dispersion is nearly completed. In a preferred embodiment, multi-stage homogenisation takes place, by means of which the double emulsion droplets are processed. Stabilization is substantially facilitated by the emulsifier molecules in this embodiment. Using the jet disperser as a dispersing device, it is possible to prodispenon-aqueous dispersions with defined particle sizes (influencing factors: pressure and number of passages) which are adapted to the interface/surface kinetics of the emulsion system.

In a preferred embodiment, the liquid prepolymer is initially placed in a circulation container at a constant temperature and is passed through a single or multi-stage jet disperser using a booster pump, but the non-aqueous dispersion is preferably recirculated. The drop in pressure per nozzle is 1 to 20 bar, depending on the particle size required. At the same time, silicone oil, as the preferred non-aqueous liquid, is introduced with the emulsifier and is incorporated as an emulsion. Phase inversion can be observed due to the drop in homogenisation pressure. As a result of further recirculation at a defined pressure drop per nozzle, an emulsion with defined particle sizes is produced. Then the hardener can be introduced in a defined mass flow, using a metering pump. The circulation tank is preferably cooled so that the temperature is preferably less than 30° C. When addition is complete, the reaction mixture is preferably heated to less than 100° C. in order to terminate the reaction.

The present invention also provides use of the non-aqueous dispersion produced by the process according to the invention as an electro-rheologic fluid.

BRIEF DESCRIPTION OF THE DRAWINGS

FIG. 1 shows the particle size distribution of dispersions prepared according to Examples 1, 2 and 3.

FIG. 2 shows the particle size distribution of the dispersion prepared according to Example 4.

FIG. 3 shows the particle size distribution of the dispersion prepared according to Comparison Example 1.

FIG. 4 shows the effect of homogenizing pressure on particle size distribution.

The following examples are used to explain the invention. The invention is not, however, restricted to these examples.

Working Examples

Working examples 1 to 4, described below, were prepared by a batchwise method of preparation according to the invention using a multi-stage jet disperser. The pre-emulsion was produced by the phase inversion process. To adjust the particle size, the pre-emulsion was homogenized for two hours at a defined pressure drop per jet disperser nozzle before adding the cross-linking agent. Examples 5 to 7 describe a continuous method of preparation according to the invention. Both preparation of the pre-emulsion by the phase inversion process and adjustment to a desired particle size and particle size distribution were performed in one step by passing the mass flow through a multi-stage jet disperser.

In comparison examples 1 and 2 homogenization of the pre-emulsion was performed in accordance with the prior art using a rotor/stator shear homogenizer (Ultra-Turrax T 50 from IKA Labortechnik). The speed of the rotor was varied between 3000 and 9000 rpm.

The effect of the homogenization pressure on the particle size and particle size distribution of non-aqueous dispersions prepared according to examples 1 to 3 is shown in FIG. 1. The particle size, in particular the coarse fraction ($d_{90}$ value), decreases in proportion to the size of the homogenization pressure. At the same time, the width of the particle size distribution $U_{90}$ of the dispersion decreases with an increase in the homogenization pressure. Both parameters can thus be specifically adjusted in the process according to the invention.

Again, the particle size and particle size distribution have an effect on the conductivity and the sedimentation stability of the non-aqueous dispersion.

The sedimentation stability of the non-aqueous dispersion was determined using a centrifuge test. Here, the maximum acceleration at which no sedimentation can be detected in the non-aqueous dispersion over a period of 10 min is determined. If no sedimentation is also observed for a test period of 20 min, a "+" is added to the assessment index.

The following assessment scale was used:

Score of 1: Sedimentation stable for 10 min at an acceleration of 184.45·g

Score of 2: Sedimentation stable for 10 min at an acceleration of 118.05·g

Score of 3: Sedimentation stable for 10 min at an acceleration of 66.40·g

Score of 4: Sedimentation stable for 10 min at an acceleration of 29.51·g

Score of 5: Sedimentation stable for 10 min at an acceleration of 7.38·g

Score of 6: Sedimentation stable for 10 min at an acceleration of 1.00·g

The effect of particle size and particle size distribution on sedimentation stability and conductivity of the non-aqueous dispersion for an operating temperature of 90° C. and an applied rectangular alternating voltage of 3 kV is given in Table 1.

The electrical conductivity of the dispersion prepared by the process according to the invention decreases with increasing particle size and as the particle size distribution becomes narrower, from 115 $\mu A/cm^2$ at $d_{90}$=9.67 $\mu m$ and $U_{90}$=1.90 to 29 $\mu A/cm^2$ at $d_{90}$=6.25 $\mu m$ and $U_{90}$=1.49. At the same time, the sedimentation stability increases from three to three plus in the centrifuge test. Thus, the process according to the invention has two parameters available, the production parameters homogenizing pressure and number of homogenizing nozzles or number of homo-genising steps, which can be used to specifically adjust both the conductivity of the non-aqueous dispersion and also its sedimentation stability.

FIG. 2 shows a particle size distribution for the non-aqueous dispersion prepared according to example 4. The sum over the number of particles as a % (Q3) that are below the particle size on the x-axes is plotted against the particle size in $\mu m$. FIG. 3 shows a similar plot for the non-aqueous dispersion prepared according to comparison example 1. The non-aqueous dispersion prepared according to comparison example 1 has the same chemical composition as the dispersion prepared according to example 4. When FIG. 3 is compared with FIG. 2, it is clear that larger particles with a broader particle size distribution are produced when preparing the non-aqueous dispersions according to the prior art.

FIG. 4 shows the effect of homogenizing pressure on the particle size during continuous performance of the process according to the invention in examples 5 to 7.

The particle size can also be specifically adjusted during continuous preparation, via the homogenizing pressure. The coarse fraction in particular ($d_{90}$) decreases significantly with increasing homogenization pressure.

Table 2 compares the particle sizes and particle size distributions, the conductivity and the sedimentation stability of the non-aqueous dispersions prepared in accordance with example 4 and comparison examples 1 and 2. The particle size, in particular the coarse fraction ($d_{90}$ value), and the particle size distribution of the non-aqueous dispersions prepared in accordance with the comparison examples are much larger and broader respectively than those of the non-aqueous dispersion prepared according to the invention, in accordance with example 4. The sedimentation stability of the comparison examples is much poorer than the sedimentation stability of the samples prepared in accordance with the process according to the invention, in accordance with example 4. The conductivity of comparison examples 1 and 2 is also higher than that of the non-aqueous dispersion prepared in accordance with the invention.

The following constituents were used in the following examples and comparison examples:

| | |
|---|---|
| As non-aqueous liquid: (Dispersion medium) | Polydimethylsiloxane (silicone oil) |
| | Viscosity at 25° C.  5 $mm^2/s$ |
| | Density at 25° C.  0.9 $g/cm^3$ |
| | Relative dielectric constant  2.8 |
| | $\epsilon_r$ according to DIN 53 483 |
| | at 0° C. and 50 Hz |
| As prepolymer: | Trifunctional polyethylene glycol with a molecular weight of 1015, prepared by ethoxylation of trimethylolpropane |
| As dispersant: | Reaction product of 40 parts of octamethyl-cyclotetrasiloxane and 2 parts of N-(β-Amino-ethyl)-γ-aminopropylmethylmethyl-diethoxysilane |
| As hardener: | toluene diisocyanate (TDI). |

EXAMPLE 1

12.0 kg of prepolymer together with 0.012 kg of zinc chloride were pumped through the multi-stage disperser, with an admission pressure of 60 bar, and circulated in a standard stirred tank, while adding a mixture comprising 13.80 kg of non-aqueous liquid and 1.20 kg of dispersant. Phase reversal took place in this way. The pressure was readjusted to 40 bar. The homogenizing time was 2.5 hours. Then 2.97 g of TDI were metered into the pre-emulsion and the samples were transferred to a separate heatable stirred tank. The samples were then cured for 2 hours at 60° C.

The non-aqueous dispersion prepared in this way exhibited an electro-rheological effect τ of ≧1200 Pa at 90° C., with a applied rectangular alternating voltage of 3 kV and a frequency of 50 Hz.

The precise physical data and the experimental results for the non-aqueous dispersion are given in Table 1.

EXAMPLE 2

The preparative procedure was the same as in example 1, but the homogenizing pressure was 45 bar. The non-aqueous dispersion prepared in this way exhibited an electro-rheological effect τ of ≧1200 Pa at 90° C., with a applied rectangular alternating voltage of 3 kV and a frequency of 50 Hz.

The precise physical data and the experimental results for the non-aqueous dispersion are given in Table 1.

EXAMPLE 3

The preparative procedure was the same as in example 1, but the homogenizing pressure was 50 bar. The non-aqueous dispersion prepared in this way exhibited an electro-rheological effect τ of ≧1200 Pa at 90° C., with a applied rectangular alternating voltage of 3 kV and a frequency of 50 Hz.

The precise physical data and the experimental results for the non-aqueous dispersion are given in Table 1.

via a mixer. The non-aqueous dispersion was cured in a heatable stirred tank for one hour at 80° C.

The non-aqueous dispersion prepared in this way exhibited an electro-rheological effect τ of ≧2300 Pa at 60° C., with a applied rectangular alternating voltage of 3 kV and a frequency of 50 Hz.

EXAMPLE 6

The same preparative procedure was used as in example 5, but using a pressure of 70 bar.

The non-aqueous dispersion prepared in this way exhibited an electro-rheological effect τ of ≧2300 Pa at 60° C., with a applied rectangular alternating voltage of 3 kV and a frequency of 50 Hz.

EXAMPLE 7

The same preparative procedure was used as in example 5, but using a pressure of 80 bar.

The non-aqueous dispersion prepared in this way exhibited an electro-rheological effect τ of ≧2300 Pa at 60° C., with a applied rectangular alternating voltage of 3 kV and a frequency of 50 Hz.

Comparison Example 1

59.5 g of prepolymer, together with 0.105 g of lithium chloride, were initially introduced to a beaker with a nomi-

TABLE 1

Effect of emulsifying pressure on the particle size, particle size distribution, sedimentation stability and conductivity of the non-aqueous dispersions prepared in accordance with examples 1 to 3

| Non-aqueous dispersion according to | Pressure [bar] | Particle size $d_{10}$ [μm] | Particle size $d_{50}$ [μm] | Particle size $d_{90}$ [μm] | Particle size distribution $U_{90}$ [$\frac{d_{90} - d_{10}}{d_{50}}$] | Sedimentation stability (centrifuge test) | Current density at 3 KV/mm T = 90° C. J [μA/cm²] |
|---|---|---|---|---|---|---|---|
| Example 1 | 40 | 1.86 | 4.11 | 9.67 | 1.90 | 3 | 115 |
| Example 2 | 45 | 1.54 | 3.51 | 7.46 | 1.69 | 3 | 31 |
| Example 3 | 50 | 1.58 | 3.15 | 6.25 | 1.49 | 3+ | 29 |

EXAMPLE 4

The same preparative procedure was used as in example 1, but 0.021 kg of lithium chloride was used instead of ZnCl$_2$ and the amount of hardener added was 3.06 kg of TDI. 150 g of the hardener was added to the pre-emulsion before homogenizing.

The non-aqueous dispersion prepared in this way exhibited an electro-rheological effect τ of ≧2400 Pa at 60° C., with a applied rectangular alternating voltage of 3 kV and a frequency of 50 Hz.

The precise physical data and experimental results for the non-aqueous dispersion are given in Table 2.

EXAMPLE 5 (continuous preparation)

The following were metered into a mass flow of 47.81 kg/h of a mixture comprising 100 parts by wt. of prepolymer and 0.18 parts by wt. of lithium chloride: 1) a mass flow of 39.97 kg/h of a mixture comprising 100 parts by wt. of silicone oil as non-aqueous liquid and 2.65 parts by wt. of dispersant and 2) a mass flow of 0.61 kg/h of hardener. The pre-emulsion was passed through a multi-stage jet disperser at a pressure of 60 bar with phase inversion. Then a mass flow of 9.69 kg/h of hardener was metered into the emulsion nal volume of 400 ml. A pre-emulsion was produced by adding a mixture comprising 73.65 g of silicone oil as non-aqueous liquid and 1.3 g of dispersant and then hemogenizing with a rotor/stator shear homogenizer (Ultra-Turrax T50 from IKA Labortechnik) for a period of one minute at 3000 rpm. Then 15.3 g of hardener were added. The reactive mixture was then homogenized for 30 seconds at 6000 rpm and then cured at 50° C. for 12 hours.

The non-aqueous dispersion prepared in this way exhibited an electro-rheological effect τ of ≧2300 Pa at 60° C., with a applied rectangular alternating voltage of 3 kV and a frequency of 50 Hz.

The precise physical data and experimental results for the non-aqueous dispersion are given in Table 2.

Comparison Example 2

The same preparative procedure was used as in comparison example 1, but the pre-emulsion was homogenized for one minute at 9000 rpm.

The non-aqueous dispersion prepared in this way exhibited an electro-rheological effect τ of ≧2300 Pa at 60° C., with a applied rectangular alternating voltage of 3 kV and a frequency of 50 Hz.

The precise physical data and experimental results for the non-aqueous dispersion are given in Table 2.

TABLE 2

Comparison of particle sizes, particle size distribution, sedimentation stability and electrical conductivity of a non-aqueous dispersion prepared in accordance with the process according to the invention and in accordance with comparison examples 1 and 2

| Non-aqueous dispersion according to | Particle size $d_{10}$ [μm] | Particle size $d_{50}$ [μm] | Particle size $d_{90}$ [μm] | Particle size distribution $U_{90} = \dfrac{d_{90} - d_{10}}{d_{50}}$ | Sedimentation stability (centrifuge test) | Current density at 3 KV/mm T = 60° C. J [μA/cm$^2$] |
|---|---|---|---|---|---|---|
| Example 4 | 1.37 | 3.38 | 6.79 | 1.60 | 3+ | 90 |
| Comparison example 1 | 1.31 | 5.43 | 16.81 | 2.86 | 5+ | 162 |
| Comparison example 2 | 1.16 | 3.87 | 13.07 | 3.0 | 4 | 242 |

We claim:

1. A process for preparing non-aqueous dispersions, wherein at least one liquid prepolymer, optionally in the presence of one or more conductive components, is emulsified in at least one non-aqueous liquid, optionally in the presence of one or more dispersants, the droplet size of the emulsion is adjusted to 0.1 to 30 μm inclusive and the droplet size distribution $U_{90}$ is adjusted to less than 2 by means of a jet disperser and the droplets are cured by a chemical reaction.

2. A process according to claim 1, wherein said liquid prepolymer is at least one compound which contains hydroxy, amino, (meth)acrylate, methacrylamide or vinyl groups or a combination of said groups.

3. A process according to claim 1, wherein said non-aqueous liquid is a silicone oil.

4. A process according to claim 1, wherein the average particle diameter of the dispersed prepolymer is adjusted to 1 to 20 μm.

5. A process according to claim 1, wherein said jet disperser is a multi-stage dispenser.

6. A process according to claim 1, wherein the cured emulsified particles have a conductivity of $10^{-9}$ to $10^{-6}$ S/cm.

7. A process according to claim 1, wherein the conductive component is an organic semiconductor, an inorganic semiconductor, an ionic semiconductor or a combination thereof.

8. A process according to claim 1, wherein the dispersant is selected from the group consisting of reactive dispersants having functional groups which enable chemical linkage with the surface of the prepolymer droplets.

9. A process according to claim 1, wherein said dispersant is selected from the group consisting of reaction products from OH-terminated polydimethylsiloxanes and aminopropyltriethoxysilane, the reaction product of octamethylcyclo-tetrasiloxane and N-(β-aminoethyl-γ-aminopropyl)-methyldiethoxysilane and combinations thereof.

10. A process according to claim 1, wherein the emulsified particles are cured by at least one hardener.

11. A process according to claim 10, wherein up to 10% of the total amount of the hardener is added before dispersion with the jet disperser.

12. A process according to claim 1, wherein the prepolymer is selected from the group consisting of polypropylene oxide/polyethylene oxide copolymers, trifunctional polyethylene glycols, polytetrahydrofuran and combinations thereof, the non-aqueous liquid is polydimethylsiloxane, toluene diisocyanate is used as a hardener to cure the emulsifier droplets and the conductive components are selected from the group consisting of LiCl, $ZnCl_2$, carbon black and combinations thereof.

13. A process according to claim 1, wherein a liquid prepolymer, a dispersant and a hardener and optionally conductive components are present, in a total amount of 40 to 60 wt.-% of total dispersion.

14. A process according to claim 1, wherein said non-aqueous liquid is emulsified in said liquid prepolymer and a phase inversion takes place due to the further addition of said non-aqueous liquid and passage through the jet disperser.

* * * * *